United States Patent Office 3,544,958
Patented Dec. 1, 1970

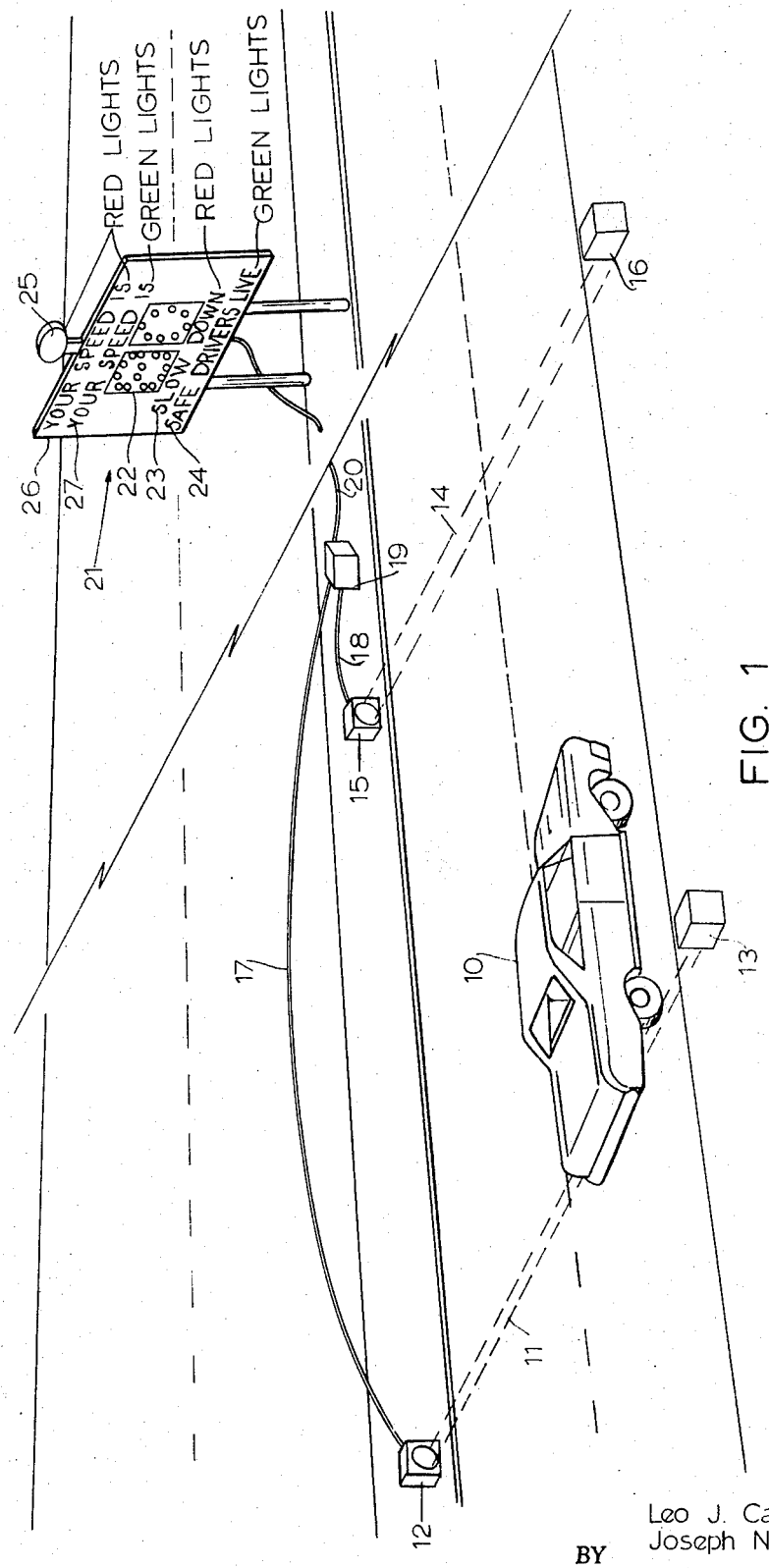

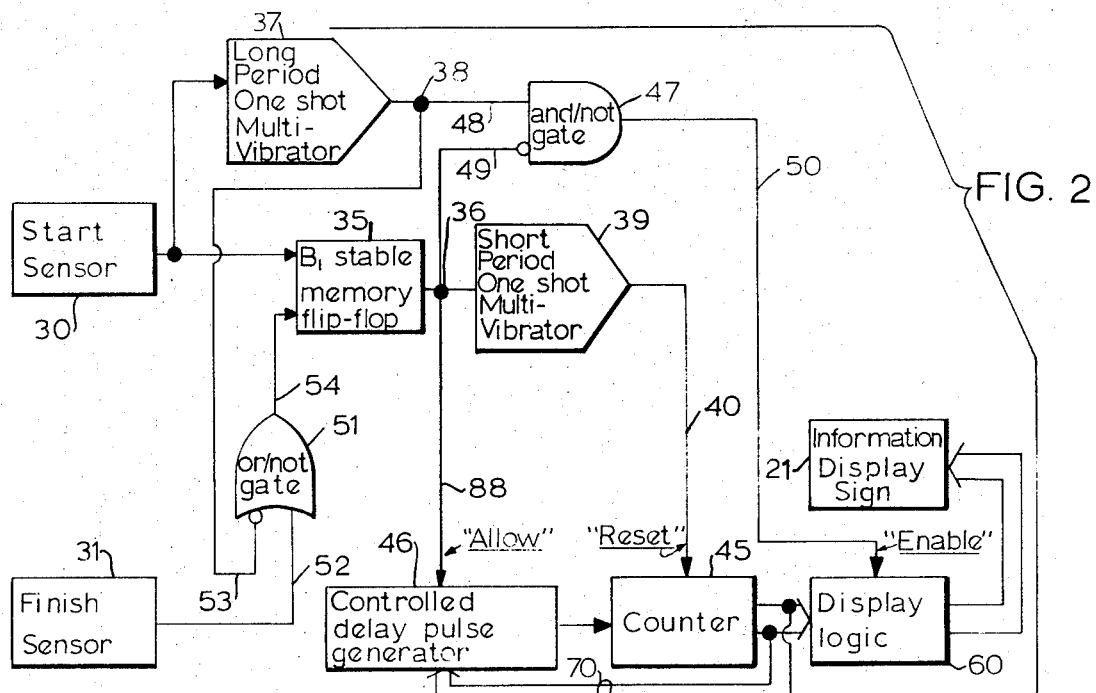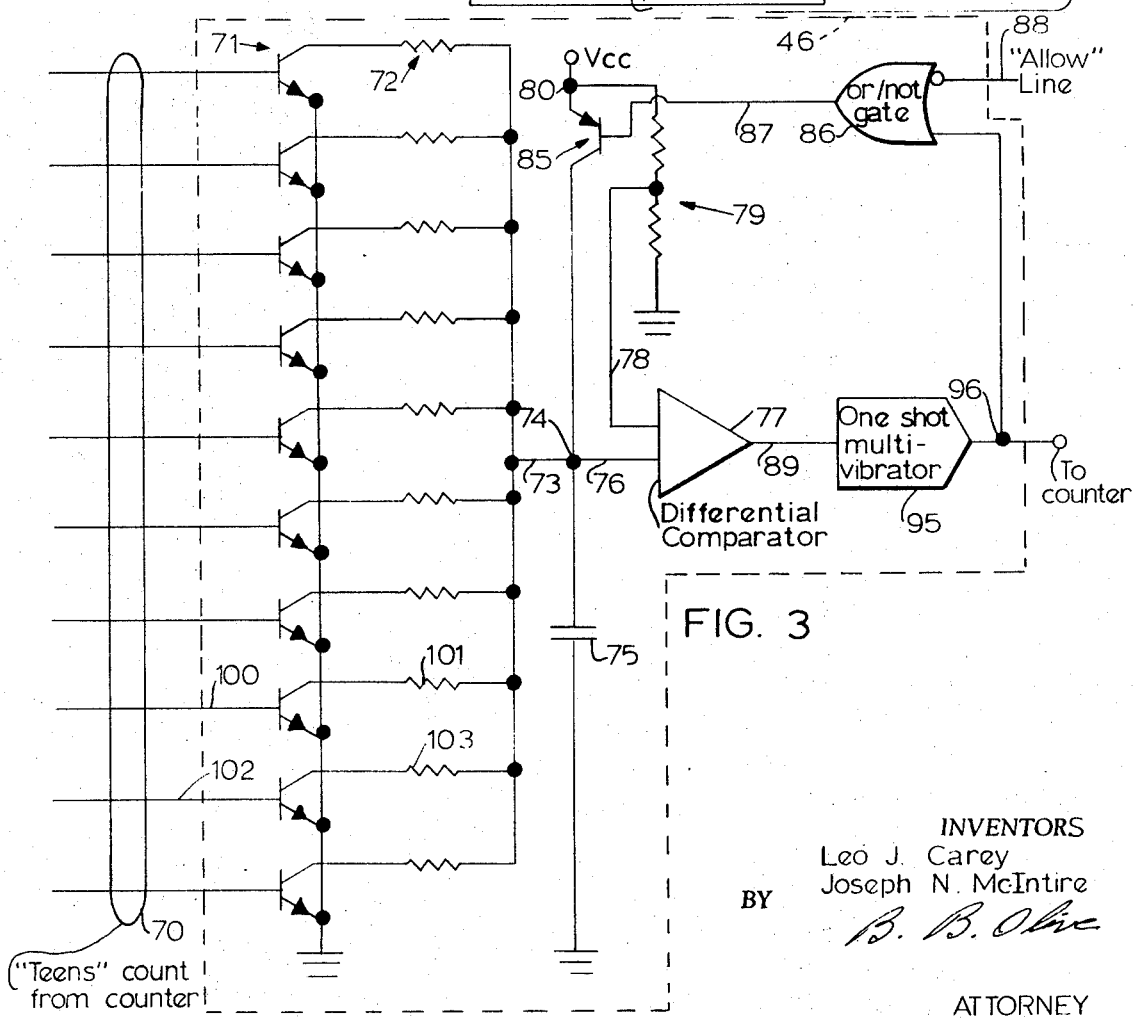

3,544,958
SELECTIVE SPEED SIGNS ACTUATED BY
VEHICLE SPEED SENSING
Leo J. Carey, Raleigh, and Joseph N. McIntire, Durham, N.C.; said McIntire assignor, by mesne assignments, to Leo J. Carey, Raleigh, N.C., a partnership composed of Leo J. Carey and James A. Thompson
Filed Sept. 11, 1967, Ser. No. 666,627
Int. Cl. G08g 1/04
U.S. Cl. 340—31
5 Claims

ABSTRACT OF THE DISCLOSURE

A system for measuring vehicular speed and for displaying such speed to the driver by signs that are selectively actuated according to the speed measured comprises a pulse generator fed counter which is controlled by a pair of spaced speed sensors and which in turn controls a display logic circuitry. The rate of counting is constantly changed by periodically feeding back to the pulse generator the state of the count so that at high speeds the rate of counting is relatively high and at low speeds is relatively low.

BACKGROUND OF THE INVENTION

Field of the invention

The invention is related to systems for measuring vehicular speed and to information signs embodied as part of such systems such that the signs are selectively actuated according to the speed measured.

Description of the prior art

Vehicular speed sensing and the operation of speed indicators is old in the art as a means of obtaining information for the purpose of arrest. It is also generally old in the art to detect the presence of a vehicle or to monitor speed and/or volume of traffic and actuate traffic signs according to the presence of a vehicle or speed or traffic volume. See U.S. Pats. 3,024,443, 3,004,-043 and 3,275,984 as representing typical prior art. It is also old to visually display speed by roadside positioned mechanical means such that the driver is alerted to his actual speed and in this regard see U.S. Pat. 2,783,730. What has not been provided by the prior art is a speed sensing and accident preventive system which both simultaneously displays the measured speed and indicates to the driver whether such speed is either safe or dangerous at the location where the speed is measured.

SUMMARY OF THE INVENTION

The circuitry disclosed employs two spaced, chopped light, speed sensors. Each sensor develops a pulse when its respective light beam is interrupted and the elapsed time between interruption of the first and second light beams by a moving vehicle is "counted" and the count is employed to develop a signal representative of speed and to control a display logic circuit which in turn controls an information sign which is visible to the passing motorist. The information sign employs one logic controlled section which displays the actual speed measured. The sign also includes a speed warning sign which is selectively actuated by the logic circuit whenever the measured speed is in excess of some predetermined legal speed and further include a safe driving or speed approval sign whenever the measured speed is at or below such legal speed. The speed is effectively measured by counting pulses emitted by a pulse generator and fed to a counter circuit. To compensate for the fact that the time interval between counting down from say 99 m.p.h. to 98 m.p.h. is substantially less than the time required to count down from say 50 m.p.h. to 49 m.p.h. the counting rate must constantly vary and this is accomplished in the present invention by a feedback loop from the counter back to the pulse generator which feeds pulses to the counter. As the counter moves down scale from an arbitrary top count corresponding say to 99 m.p.h. the rate of counting, i.e., the rate at which the pulse generator operates, is periodically reduced. It has been found that if the rate of counting is adjusted in this manner at intervals of 10 m.p.h. a substantially accurate speed measurement is obtained.

An object of the invention is that of preventing accidents by providing a vehicular speed measuring system and a speed display sign such that the driver, other occupants of the driver's vehicle and other drivers are immediately advised as to the speed measured.

A further object is that of providing means by which vehicular speed can be measured and the measured speed used to control signs either warning or commending the driver dependent on the value of the speed measured.

Another object is that of providing circuitry for measuring speed utilizing a pulse fed counter and in which the state of the count controls the rate at which pulses are fed to the counter such that compensation is made for the wide variation in rate of counting required between high and low speed measuring.

The foregoing and other objects will become apparent as the description proceeds.

DESCRIPTION OF THE DRAWINGS

FIG. 1 is a schematic perspective view of a highway environment embodying the speed sensing and information sign apparatus of the invention.

FIG. 2 is a circuit diagram in block diagram form illustrating a circuit suited to the invention; and FIG. 3 is a circuit line diagram illustrating in more detail a portion of the circuit devoted to changing the counting rate according to the speed being measured.

DESCRIPTION OF THE PREFERRED EMBODIMENT

Referring to FIG. 1, the moving vehicle 10 first interrupts a chopped light beam 11 produced by a light source and pulse unit 12 and reflected along the same axis by a suitable reflector 13 back to the light source and pulse unit 12. As the vehicle continues to move in the direction indicated it interrupts a second chopped light beam 14 produced by a second light source and pulse unit 15 and reflected by a suitable second reflector 16. The source 12 and reflector 13 may be considered as the "start sensor," labelled 30 in FIG. 2, and the source 15 and reflector 16 may be considered as the "finish sensor," labelled 31 in FIG. 2. Such light beam type sensors and pulse units are well known in the art and are therefore not otherwise treated in detail. The use of chopped light and optics for splitting the reflected light as a means of discriminating against ambient light and other spurious light sources is also known and is of particular advantage in the present circuitry and in the environment of public highway usage. Such sensors should also be of a type rendering them capable of responding with variations in time delay that are small compared to the timing interval. The sensors should also be relatively insensitive to weather and ambient light. Further, it is desirable that both the start and finish sensors be of a type productive of a substantially wide, in the order of several microseconds wide, single pulse whenever the chopped light beam is broken. Chopped light may be produced in various well known ways. A rotating disc has been found useful to the invention for production of a light beam in the form of light pulses which necessarily have to be very narrow compared to the timing interval. Using a 20-foot sensor spacing and a light interruption frequency of 5.5 kilohertz, a coded light signal is produced and which is in the nature of an "AC" type signal which is particularly suited to processing. It should also of course be understood that each of the start and finish sensors include the usual optical beam splitting components and necessary standard pulse generator circuitry.

Continuing with the description of FIG. 1, the pulse outputs of the start and finish sensors are fed through suitable connections indicated in FIG. 1 as lines 17, 18 to counting and display logic circuitry 19 and which in turn is connected by line 20 to a substantially large, e.g. 6 x 8 feet, information display sign 21. Sign 21 is located at a remote location from the sensing location, e.g. 250 feet, so as to be prominently visible to the driver and includes a two digit lamp bank section 22 suited to form large, e.g. two foot, two digit numbers up to and below 100 m.p.h. Sign 21 also includes an electric, red, warning sign 23 and which when illuminated in the example shown reads "Slow Down" and further includes an electric, green, safety approval sign 24 which when illuminated in the example shown reads "Safe Drivers Live." Red and green signs 26, 27 both reading "Your Speed Is" also constitute part of sign 21 for selective actuation as later discussed. A suitable warning signal light 25 may also be provided and connected to be illuminated simultaneously with illumination of the warning sign 23.

As a general explanation of the operation of the circuitry of the system as shown in FIG. 1, it will be understood that the vehicle will break the light beam 11 and at some later time will break the light beam 14. The time interval between breaking of the light beams is converted as later explained into logic signals such that lamp bank section 22 will show in two digits the speed measured and if such speed is above the legal limit the warning signs 23 and 26 and warning light 25 will be lit simultaneous with a display of the speed. Alternatively, the safe driving approval signs 24 and 27 only will be lit if the measured speed is below the legal limit. The signs are held for a predetermined time interval, e.g. five seconds, while the vehicle is moving from the last sensor location to the sign location. Thus, the car driver is given the psychological shock of having his speed, if an excessive speed, displayed to himself, any other occupants of the vehicle and to other nearby motorists as well as law enforcement officials. However, if such speed is within the speed limit the driver and such persons are so advised and the driver is psychologically complimented for his safe driving.

Referring next to FIG. 2, the outputs of the start sensor 30 and the finish sensor 31 constitute relatively wide, in the order of several microseconds, singe pulses which are produced upon breaking of the respective light beams 11, 14. The output pulse from start sensor 30 sets a bi-stable memory flip-flop circuit 35 in an "on" condition and establishes a predetermined voltage level at junction 36. This pulse from start sensor 30 also starts into operation a long period, one-shot, multi-vibrator 37 which produces at junction 38 a substantially wide pulse in the order of several seconds wide. The presence of the voltage level at junction 36 also in turn starts operation of a short period, one-shot, multi-vibrator 39 which is productive of a narrow pulse on line 40 which is fed to the counter 45 and acts to reset counter 45 from whatever prior count condition it was in to the count of "99," i.e., counter 45 is reset such that count 99 is reached at the time required for a vehicle to reach the second beam 14 at a speed of 99 m.p.h. Counter 45 now starts counting down. It may also be noted that the presence of the voltage level at junction 36 also acts to turn on a controlled delay pulse generator 46 and count pulses are emitted by generator 46 at an initial, substantially fast, counting rate corresponding to counting down from 99 m.p.h. towards 90 m.p.h. Generator 46 is the dashed-line box in FIG. 3.

Prior to discussing the effect of the pulse from the finish sensor 31, it will be noted that the circuit of FIG. 2 includes and "And/Not" gate 47. Operation of gate 47 is such that if a signal is on line 48 but not on line 49 then an output will appear on "enable" line 50. A further "Or/Not" gate 51 is connected as shown and operates in the manner that if a signal is on line 52 or if a signal is not on line 53, an output will appear on line 54.

Assuming the vehicle 10 has broken the second light beam 14, the finish sensor 31 of FIG. 2 is designed so as to produce a substantially wide pulse the effect of which is to put gate 51 in condition to reset the flip-flop circuit 35 back to an "off" condition. This action in turn stops the operation of pulse generator 46 and also removes the signal on line 49 which produces an output from gate 47 on line 50 until such time as the output of the multi-vibrator 37 has decayed. Line 50 in turn is connected to a display logic circuit 60 which acts to turn on the appropriate sections of the information display sign 21 and which should be understood in FIG. 2 as including the previously mentioned display warning and safety signs or messages 23, 24, 26, 27 the lamp bank speed indicator display 22 and the warning signal lamp 25. The sign turn on time is adjusted for the sign-sensor spacing and other factors and in one embodiment the signs are displayed for five seconds.

While a wide choice of standard integrated logic and counting circuits are suited to the invention, a counter suited to the invention has been found to be a binary coded decimal counter, Texas Instruments, Inc., Dallas, Tex. TI-SN 7490N, connected to a decimal decoder, Texas Instruments TI-SN 7441N, in a negative logic system, i.e., if "5" is the count, then "5" will be a negative signal. The display signs 23, 24, 26 and 27 are formed such that messages are in permanent form but are essentially unintelligible until energized. Neon formed letters, or letters formed in front of incandescent lamps are examples of display structures suited to the invention. The speed digits as previously stated are formed by lamp bank 22 and this may take many forms depending on the particular display logic employed. Also, the digits may be formed by other means such as by electroluminescent segments.

In arriving at the invention it has been found practical to limit speed to be measured to 99 m.p.h. and for counter 45 to start counting down from 99 m.p.h. As previously mentioned, it has also been found necessary to provide means for varying the rate of counting as the counter 45 counts down from the higher to the lower speeds. That is, if one vehicle speed is measured, say 85 m.p.h., and the next vehicle speed is measured, say 50 m.p.h., the rate of counting with respect to the second vehicle must be substantially slower at the time its speed is determined than in the case of the first vehicle. The time T in which the "count" must jump from one count to the next is indicated by the formula:

$$T = \frac{L}{(W-N)(W-N+1)}$$

L equals the distance between sensors in appropriate units, as for example in miles, W equals the maximum speed measured, i.e., 99 m.p.h., N equals the actual number of counts to the present time and with these units of measurement T will be derived in hours.

The counter is initially "set" at "9" such that if a vehicle going exactly 99 m.p.h. were being measured the counter would be at "99" when the vehicle broke the second beam 14. Stated differently, the counter moves from "9" to "99" in the time required for the vehicle to move from the first beam 11 to the second beam 14 at a speed of 99 m.p.h.

A circuit arrangement which is both simple and practical for achieving the required periodic variation in the rate of counting is illustrated in FIG. 3. While theoretically, the rate of counting might be changed on each count as the count moves down it has been found necessary to vary the count only after each count of ten. Thus the counting rate is changed at count 90, count 80, count 70, count 60, count 50, count 40, count 30, count 20 and count 10 and remains constant between these points of change. Thus if a vehicle speed of 58 m.p.h. is measured the counting rate will have been changed at count 90, count 80, count 70, and count 60 just prior to the final count leading to the speed measurement. This is accomplished by a feedback loop 70 from the counter 45 back to the pulse generator 46 such that the teens count will periodically adjust the pulse rate of generator 46 up until the counting operation is stopped by the vehicle breaking the second beam 14.

In FIG. 3 the dashed line encompasses those components making up the pulse generator 46 of FIG. 2. The various "teens" lines making up the feedback loop 70 are shown connected to the bases of corresponding NPN switching transistors 71 and with each respective transistor collector being connected to one of a parallel bank of resistors 72. Each resistor 72 is of a different value and whichever resistor is switched in forms with capacitor 75 an R-C circuit the time factor of which determines the pulse delay or counting rate. Resistors 72 have a common terminal line 73 connected to a junction 74. Transistors 71 are open until they receive a base drive and they then act as essentially short circuits or closed switches. Connected to this same junction 74 is one side of a grounded, low leakage and stable capacitor 75 and one input line 76 of a differential comparator 77. Another input line 78 for comparator 77 is connected to a potential divider 79 as shown and which provides a reference voltage for comparator 77. Divider 79 in turn is connected between ground and a suitable transistor collector potential $V_{cc}$ at junction 80 to which is connected the emitter of a PNP switching type transistor 85 the collector of which is connected to junction 74. An "Or/Not" gate 86 has on one side a line 87 connected to the base of transistor 85 and on the other side a line 88 which represents the "allow" line shown in FIG. 2. It will also be noted that comparator 77 is connected by line 89 to the input of one-shot, multi-vibrator 95 which through a junction 96 is connected back to the counter 45. Multi-vibrator 95 should have a stable period long enough to allow capacitor 75 to be fully charged by transistor 85. Also connected to junction 96 is a line 97 leading from the "Or/Not" gate 86.

Considering the operation of the circuitry of FIGS. 2 and 3 from the viewpoint of counting and controlling the rate of counting, it can be said that counter 45 receives inputs in the form of single pulses developed by pulse generator 46 and the count is changed by one each time a pulse is received. Further, it is the purpose of the circuitry of FIG. 3 to control the time delay after pulse generator 46 produces one pulse and before it produces the next pulse and the signals fed back by the lines comprising the feedback loop are in control of this time delay. Furthermore, pulse generator 46 is operative and productive of pulses only when a voltage level is present on the "allow" line 88. Other operational features to be noted are that when the allow voltage is off or if a signal is present on junction 96, transistor 85 will be in a conducting state, that prior to counting, capacitor 75 is in a charged state, and that the differential comparator 77 produces an output whenever the voltage on line 76 is less than the voltage on line 78. Thus, as long as the circuit is delaying prior to the generation of a count pulse, allow line 88 is on and generator 95 is off and transistor 85 is open. Capacitor 75, which prior to counting starts in a fully charged state, will discharge through whichever resistor 72 is being employed thus if the teens count is 80 and the counter is counting down toward 70 we might consider line 100 and resistor 101 as being active. As capacitor 75 discharges through resistor 101, the voltage on line 76 will fall until comparator 77 is triggered to produce a level on line 89 which causes multi-vibrator 95 to emit one pulse to counter 45. The presence of such pulse at junction 96 will, however, act to momentarily open gate 86 which will cause transistor 85 to close and voltage $V_{cc}$ to recharge capacitor 75. Upon the decay of the pulse at junction 96, transistor 85 will open leaving capacitor 75 fully charged. As soon as the count has moved down so that the teens changes from say 80 to 70 another teens count line and resistor will be employed such as line 102 and resistor 103 which in conjunction with capacitor 75 will introduce a different and slower R-C time. The operation of comparator 77 and multi-vibrator 95 will thus be slowed down but the pulse sequence will be repeated as before but at a slower rate. Once the second beam 14 has been broken by the vehicle counting will of course stop and the circuit will revert to the non-counting state previously explained.

In summary, it will be seen that the invention circuitry provides the motorist and law enforcement officials with a speed control approach which partakes of being both preventive and commendatory as to the safe drivers. Further, it can be seen that particular circuitry disclosed is widely variable in application in that the output signals could be employed to trigger alarms, flashing lights or other instrumentalities designed either to warn the driver or alert a law official to the fact that the speed law has been violated. Further, it is deemed within the scope of the invention to regard the "display" as constituting a series of lights such that above certain speeds the driver would be warned with a red light, within a lower range with a yellow caution light and below this with a green light such that the same driver psychology to which the driver is accustomed with street traffic lights is carried over to the high speed public highways.

Having described the invention, what is claimed is:
1. A speed deterrent system including, in combination:
   (a) roadside detecting means for detecting the presence and speed of a moving vehicle and developing first and second electrical signals spaced by a time interval corresponding to the time required for said vehicle to move a predetermined distance at a given speed;
   (b) control means connected to said detecting means and electrically controlled by said first and second signals and dependent on said time interval to produce a set of display logic signals, said control means including a pulse generator and counter and means for periodically varying the rate of pulse generation and counting according to the length of said time interval such that said control means automatically compensates for counting time differences between various speeds;
   (c) speed indication means electrically controlled by the state of said logic signals and effective to create a visual roadside display indicative of the speed of said vehicle; and
   (d) selective sign means electrically controlled simultaneously with control of said speed indication means by the state of said logic signals including a first speed approval indicator and a second speed warning indicator, electrical actuation of said approval indicator being dependent upon said time interval indicating a safe measured speed and electrical actuation of said warning indicator being dependent upon said time interval indicating an unsafe measured speed.

2. The system of claim 1 wherein said means for varying said count comprises means for feedback of the state of said counter at "teens" intervals and for adjustment of the rate of pulsing of said generator according to the state of said count at said "teens" intervals.

3. A speed deterrent system including, in combination:
   (a) roadside detecting means for detecting the presence and speed of a moving vehicle comprising a pair of chopped-light photo-electric sensors spaced a predetermined distance and productive of first and second electrical timing pulses spaced by a time interval proportional to the time required for said vehicle to move said predetermined distance at a given speed;

(b) control means connected to said detecting means and electrically controlled by said first and second pulses and dependent on said time interval to produe a set of display logic signals, said control means including a pulse generator and counter and means for periodically varying the rate of pulse generation and counting according to the length of said time interval such that said control means automatically compensates for counting time differences between various speeds;

(c) speed indication means electrically controlled by the state of said logic signals comprising a lamp bank effective to display the measured speed by selective actuation of lamps comprising said lamp bank according to the state of said display logic signals;

(d) selective sign means electrically controlled simultaneously with control of said speed indication means by the state of said logic signals including a first speed approval indicator and a second speed warning indicator, actuation of said approval indicator being dependent upon said time interval indicating a safe measured speed and actuation of said warning indicator being dependent upon said time interval indicating an unsafe measured speed; and (e) means for varying said count comprising means for electrical feedback of the state of said counter at "teens" intervals and adjustment of the rate of pulsing of said generator according to the state of said count at said "teens" intervals.

4. A speed deterrent system for measuring and displaying the speed of a moving vehicle including, in combination:

(a) a start sensor comprising a chopped-light sensing circuit productive of a first chopped-light beam crossing transversely the path of said vehicle at a first station and productive when interrupted by said vehicle of a first single timing pulse indicative of the time of said interruption;

(b) a pulse generator productive of counting pulses and including timing means for controlling the rate of said counting pulses;

(c) first switching means connected to said start sensor and operative upon development of said first timing pulse to start said pulse generator;

(d) a counter circuit connected to said pulse generator and operative to count said counting pulses;

(e) counter reset means connected to said switching means and operative upon development of said first timing pulse to reset said counter to a predetermined state of maximum count;

(f) a finish sensor comprising a chopped-light sensing circuit productive of a second chopped-light beam crossing transversely the path of said vehicle at a second station spaced from said first station lengthwise of the path of travel of said vehicle a predetermined distance and productive when interrupted by said vehicle of a second single timing pulse spaced in time from said first timing pulse by a time interval corresponding to the time required for said vehicle to move said distance at a given speed;

(g) a display logic circuit connected to and controlled by the count of said counter and productive when in an "enable" state of a set of logic signals corresponding to the vehicle speed measured by said count;

(h) second switching means connected to said finish sensor and to said first switching means and operative upon development of said second timing pulse to stop said counter and place said display logic in an "enable" state;

(i) an electrically actuated display controlled by the state of said logic signals when so enabled and including a first speed warning sign depending for energization upon said state of logic signals indicating a measured speed above a predetermined speed, a second speed approval sign depending for energization upon said state of logic signals indicating a measured speed at or below said predetermined speed, and a third sign indicative of the actual said predetermined speed which is measured; and (j) feedback connection means between the output off said counter and said pulse generator and including in said pulse generator a bank of resistor-capacitor combinations of differing time constant and switching means dependent on the state of said counter for selecting a particular combination such that differing time constants control the rate of operation of said pulse generator at steps of "teens count."

5. A speed deterrent system including, in combination:

(a) roadside detecting means for detecting the presence and speed of a moving vehicle and developing first and second electrical signals spaced by a time interval corresponding to the time required for said vehicle to move a predetermined distance at a given speed;

(b) control counter means connected to said detecting means and electrically controlled by said first and second signals and dependent on said time interval to produce a set of logic signals and having means dependent on the length of said time interval to compensate for counting time differences between various speeds;

(c) speed indication means electrically controlled by the state of said logic signals and effective to create a visual roadside display indicative of the speed of said vehicle; and (d) selective sign means electrically controlled simultaneously with control of said speed indication means by the state of said logic signals including a first speed approval indicator and a second speed warning indicator, electrical actuation of said approval indicator being dependent upon said time interval indicating a safe measured speed and electrical actuation of said warning indicator being dependent upon said time interval indicating an unsafe measured speed.

References Cited

UNITED STATES PATENTS

| | | | |
|---|---|---|---|
| 1,958,631 | 5/1934 | Logan | 340—38 |
| 2,325,435 | 7/1943 | Sykora | 340—31 |
| 2,347,194 | 4/1944 | Holliday | 340—31 |
| 3,054,087 | 9/1962 | Clegg | 340—31 |
| 3,142,038 | 7/1964 | Jackson | 340—84 |
| 3,381,219 | 4/1968 | Dumbeck | 340—38 X |

THOMAS B. HABECKER, Primary Examiner

C. M. MARMELSTEIN, Assistant Examiner

U.S. Cl. X.R.

340—38